United States Patent [19]

Ishidoya et al.

[11] Patent Number: 5,025,061
[45] Date of Patent: Jun. 18, 1991

[54] AQUEOUS DISPERSION COATING MATERIAL

[75] Inventors: Masahiro Ishidoya; Toru Soma, both of Yokohama; Hisao Ogawa, Zushi, all of Japan

[73] Assignee: Nippon Oil and Fats Co., Ltd., Tokyo, Japan

[21] Appl. No.: 584,510

[22] Filed: Sep. 17, 1990

Related U.S. Application Data

[63] Continuation of Ser. No. 206,478, Jun. 13, 1988, abandoned.

[51] Int. Cl.$^5$ .............................................. C09D 167/02
[52] U.S. Cl. .................................... 524/539; 525/440; 525/443; 525/444
[58] Field of Search ...................... 524/539; 525/444

[56] References Cited

U.S. PATENT DOCUMENTS 3,565,839  2/1971  Bender .
4,511,682  4/1985  Mayer ................................. 524/539
4,517,334  5/1985  Wilk ................................... 524/539
4,528,318  7/1985  Konishi .............................. 525/444

FOREIGN PATENT DOCUMENTS 0066197  12/1982  European Pat. Off. .
54-11141  1/1979  Japan .
2097005  10/1982  United Kingdom .

OTHER PUBLICATIONS

Commercial Pamphlet for "Toyobo Vylon" and English translation of abstract.
Catalog "Nichigo Polyesters" and English translation of abstract.
Catalog "Toray Chemits" and English translation of abstract.

Primary Examiner—C. Warren Ivy
Attorney, Agent, or Firm—Flynn, Thiel, Boutell & Tanis

[57] ABSTRACT

An aqueous dispersion type coating material capable of forming a coated film having high water resisting properties and mechanical strength contains, as a film forming constitent, an aqueous dispersion of a resin reactant of a hydrophobic, high molecular weight, linear polyester resin excellent in water resisting property and mechanical strength and a low polarity water-soluble polyester resin.

Since in this coating material, the hydrophobic high molecular linear polyester resin is added to a water-soluble polyester resin and emulsified into water in the particle size of colloidal emulsion region, the coated film is excellent in adhesive property, storage stability, finished appearance and other coated film performance.

7 Claims, No Drawings

AQUEOUS DISPERSION COATING MATERIAL

This application is a continuation of U.S. Ser. No. 07/206,478, filed June 13, 1988, now abandoned.

CROSS REFERENCE TO RELATED APPLICATION

This application is related to U.S. Ser. No. 07/206,477, filed June 13, 1988.

BACKGROUND OF THE INVENTION

1. Field of the Invention

The present invention relates to an aqueous dispersion coating material containing an aqueous dispersion of polyester resin as a film-forming constituent, and more particularly relates to an aqueous dispersion coating material capable of forming a film having a high level of water resistance and mechanical strength.

2. Description of the Prior Art

In recent years, from the viewpoint of environmental preservation and resource saving, the conversion toward an aqueous coating material which uses water as a diluent from the conventional so-called solvent coating material which uses an organic solvent as a diluent is being pushed forward. On the other hand, the required performance for a coating film has become greater recently, and, actually even an aqueous coating material is required to have excellent water resistance and strength capable of exhibiting durability over a long period of time.

Conventional aqueous coating materials can be largely classified into two types, namely, water-soluble coating materials which contain a water-soluble resin as a binder constituent and water dispersion coating materials which use a water-insoluble resin in its dispersed state. Out of these types, the water-soluble coating material needs to contain a large number of highly hydrophilic carboxyl groups or sulfonic acid groups in the resin and, therefore, is lacking in both the water resistance and the mechanical strength of the coated film. Because of this, the aqueous dispersion coating material has been studied mainly in recent years.

The following aqueous dispersion coating materials are currently known, (i) A so-called emulsion coating material which uses a dispersing element which can be obtained an emulsification/polymerization method which uses surfactants and emulsifiers.

(ii) An aqueous dispersion coating material (for example, Japanese Patent Application Lay-Open No. 212250/1982) which uses a so-called self-emulsification aqueous dispersing element which is able to be emulsified in water by incorporating sulfonic acid groups and polyalkylene glycols into the high molecular hydrophobic resin.

(iii) An aqueous dispersion coating material (for example, Japanese Patent Application Lay-Open No. 11141/1979) which uses an aqueous dispersing element obtained by a so-called mechanical emulsification method, where a water-soluble resin of low polarity is mixed with a hydrophobic resin and contacted with water and the hydrophobic resin is emulsified in water by utilizing the emulsification action of the water soluble resin as a high molecular weight surfactant.

However, the emulsion coating material of the Item (1) out of these aqueous dispersion coating materials is excellent with respect to the mechanical strength of the film by the introduction of the high molecular weight resin, but, on the other hand, is weak in water resistance because of the residues of the strongly hydrophilic surfactant and emulsifier in the coated film. The self-emulsification aqueous dispersion type coating material in Item (ii) is better in both the water resistance and in mechanical strength as compared with conventional water-soluble coating materials but fails to exhibit a high level of water resistance because it is unavoidable for the highly hydrophilic sulfonic acid groups and polyalkylene glycols to not have an adverse influence on its water resistance. The aqueous dispersion coating material obtained by the mechanical emulsification method in Item (iii) is excellent with respect to water resistance because a resin of low polarity is used as a binder constituent and the usual surfactants are not used but is limited in the emulsification of high molecular hydrophobic resins which have a high adhesive force, and therefore is not always sufficient in terms of the mechanical strength of a coated film.

As described above, all of the conventional aqueous coating materials have failed to satisfy both aspects of a high level of water resistance and high mechanical strength.

SUMMARY OF THE INVENTION

An object of the present invention is to provide an aqueous dispersion coating material exhibiting superior water-resisting properties, mechanical strength, adhesion, finished appearance and storage stability in order to solve the aforementioned problems.

An aqueous dispersion coating material of the present invention comprises, as a film forming constituent, an aqueous dispersion which is obtained by emulsifying an resin reaction product having an acid value of 10 to 30 into an aqueous medium, said resin reaction product being obtained by reacting the following resin "A" and resin "B" with each other at a ratio from 90:10 to 20:80 in weight, and condensing at least a part of resin "A" and resin "B".

Resin "A": A water-soluble polyester resin with an acid value of 20 to 50, a hydroxyl value of 50 to 200, a number average molecular weight of 1,000 to 10,000 and contains carboxyl group.

Resin "B": A hydrophobic, linear polyester resin with a softening point of 40° to 200° C. and a number average molecular weight of 10,000 to 100,000 which has been synthesized from a carboxylic acid constituent and a glycolic constituent.

DETAILED DESCRIPTION OF THE INVENTION

An aqueous dispersion coating material according to this invention introduces into an aqueous coating material, a hydrophobic, high molecular weight, linear polyester resin (hereinafter to be described simply as "Linear polyester resin") of resin "B," which is synthesized from a dicarboxylic acid constituent and a glycolic constituent, which has been shown to exhibit excellent water resistance and high mechanical strength. When the water-soluble polyester resin (resin "A"), containing a carboxyl group in the range of particular polarity, is reacted with the aforesaid linear polyester resin, the resin reaction product, in which at least a part has been condensed, can be emulsified stably into water in the presence of a base, in a particle size of the colloidal emulsion region and, moreover, in a state of high solid content. The aqueous dispersion coating material according to this invention contains, as a film forming constituent, an aqueous dispersion which can be obtained in this way. This aqueous dispersion can singularly be hardened to form a coated film, but the aqueous dispersion coating material which can be obtained by compounding an adequate hardening agent further into this aqueous dispersion is low in polarity and, moreover, has as a binder constituent, a high molecular weight resin having a high mechanical strength so that a coated film having excellent water resistance and mechanical strength is formed.

The resin "A" in this invention contains a carboxyl group and is a water-soluble polyester resin with an acid value of 20 to 50, a hydroxyl value of 50 to 200 and a number average molecular weight of 1,000 to 10,000. The resin "A" forms a condensed substance having a hydrophilic property reacted through esterification/transesterification with a part of the hydrophobic resin "B," which emulsifies the resin "B" into water.

Why the resin "A" is limited to said range is attributable to the following reason. When the acid value of resin "A" is less than 20, its hydrophilic property will be insufficient and after its condensation reaction with the resin "B", the non-reacted resin "B" will not be emulsified into a stable dispersion state in an aqueous medium, while when the acid value exceeds 50, the emulsification of the resin "B" will deteriorate and, moreover, the water resistance of a coated film lowers and is not favorable.

The hydroxyl value of resin "A" is important with respect to solubility in an aqueous medium and crosslinking points. When the hydroxyl value is less than 50, the hydrophilic property becomes insufficient and, moreover, the crosslinking points become too few, with poor water resistance and strength, while when the hydroxyl value exceeds 200, it is unfavorable because the water resistance of the coated film is adversely influenced. When the number average molecular weight of resin "A" is less than 1,000, such properties as water resistance and weatherability of the coated film may deteriorate, whereas, when the number average molecular weight exceeds 10,000, its viscosity, after its condensation reaction with the resin "B", becomes too high and is not favorable because not only does the fluidity/smoothness of the coated film during heating and drying deteriorate but also a drop in non-volatile matter of the product coating material is be invited.

The resin "B" in this invention has been synthesized from a dicarboxylic acid constituent and a glycolic constituent and is a hydrophobic, high molecular weight, linear polyester resin with a softening point of 40° to 200° C. and a number average molecular weight of 10,000 to 100,000. This resin "B" is given hydrophilic properties when it is added to the resin "A" by a condensation reaction between the functional group of the resin terminal and the functional group of resin "A," emulsified into the aqueous medium, and further enhances water resistance and mechanical strength when it has been converted into a coated film.

Why the resin "B" has been limited within the aforesaid range is attributable to the following reason. When the softening point of resin "B" is lower than 40° C., it will be inferior in mechanical strength while when the softening point exceeds 200° C., the viscosity becomes too high wherein, not only the condensation reaction with the resin "A" becomes difficult but also the emulsification of resin reaction product gets worse, thereby preventing the obtaining of a stable and fine aqueous dispersing element. When the number average molecular weight of resin "B" is less than 10,000, the water resistance and mechanical strength can not be anticipated when the resin has been converted into a coated film and, moreover, when the molecular weight exceeds 100,000, its viscosity not only becomes too high and its condensation reaction with the resin "A" becomes difficult but also unfavorably invites a decrease in nonvolatile matter in the objective coating material.

There is no particular limitation as to the aforesaid resin "A" and resin "B" so long as they have satisfied the conditions described above, and a polyester resin which is usually marketed or synthesized by the publicly known technique from the usually used polyester raw material may be used.

Out of the polyester raw materials being used in this case, such raw materials, for example, orthophthalic acid, phthalic anhydride, isophthalic acid, terephthalic acid, tetrahydrophthalic anhydride, maleic anhydride, succinic acid, glutaric acid, adipic acid, trimethyl adipic acid, azelaic acid, decamethylene dicarboxylic acid and their alcoholic esters can be enumerated as the dicarboxylic acid constituents. Further, as glycolic constituents, such substances as ethylene glycol, 1,2-propylene glycol, 1,3-propylene glycol, diethylene glycol, triethylene glycol, 1,4-butylene glycol, neopentyl glycol, 1,5-pentyl glycol, 1,6-hexyl glycol, 1,4-cyclo-hexyl glycol, ethylene oxide or propylene oxide adducts of Bisphenol A can be enumerated.

Further with regard to resin "A", polyester raw materials of one function and polyester raw materials of three or more functions can be used beside the aforesaid polyester raw material of two functions. As the carboxylic acid constituents of the polyester raw materials of one function, such natural fatty acids, as soya-bean oil, coconut oil, safflower oil, cotton seed oil, rice oil, castor oil, castor oil anhydride, hydrogenated castor oil, tung oil, linseed oil, tall oil and the like, and a variety of synthetic fatty acids of C2 through C20 can be enumerated. Also, as the alcoholic constituents, such substances as lauryl alcohol, myristyl alcohol, cetyl alcohol, stearyl alcohol and oleyl alcohol, which can be obtained by reducing the aforementioned natural fatty oils, or the synthetic alcohols of C8 through C30, alkyl substituted hydrogenated phenols of C2 through C24 can be enumerated. As the polyester raw materials of three or more functions, such substances as dimethylol propionic acid, trimellitic anhydride, pyromellitic anhydride, butane tetracarboxylic acid and the like, as well as glycerin, trimethylol ethane, trimethylol propane, 1,2,6-hexanetriol, trimethylol cyclohexane, pentaerythritol, sorbitol, diglycerol, dipentaerythritol, etc. can be enumerated. Moreover, with regard to the resin "B" too, raw materials other than the aforesaid polyester raw materials of 2 functions can be used in a range of less than 10 mol %, as necessary, against all the raw material constituents.

As the resin "B", commercially available linear polyester resins can be used, for example, VYLON 200 (a trademark of Toyobo Co. Ltd.) is composed of a polyol component consisting of ethylene glycol and neopentyl glycol in a weight proportion of about 15/85 and a polyacid component consisting of terephthalic acid and isophthalic acid in a weight proportion of about 60/40, VYLON 200 does not contain any tri- or higher functionality polyol or polyacid component, VYLON 200 has the following typical properties: acid value of 2, hydroxy value of 7 a softening point of 163° C. and number average molecular weight of 20,000, VYLON 500 (a trademark of Toyobo Co., Ltd.,) of 114° C. and number average molecular weight of 25,000), CHEMIT R188 (a trademark of Toray Co., Ltd.), softening point of 115° C. and number average molecular weight of 25,000) and CHEMIT K1294 (softening point of 155° C. and number average molecular weight of 18,000 and the like can be enumerated.

In the present invention, the aforesaid resin "A" and resin "B" is reacted with each other under heated conditions within a range of from 90:10 through 20:80 weight ratio of A:B, to condense at least a part of these resins through esterification/transesterification into the formation of a resin reaction product with an acid value of 10 to 30. This reaction adds at least a part of resin "B," which does not dissolve inherently in water, to resin "A" under the state of maintaining the former resin structure so as to grant a hydrophilic property to the latter resin, thereby not only allowing the dispersion of the condensed substance into an aqueous medium but also permitting the emulsification of non-reacted resin "B" into an aqueous medium by dint of its interfacial activity. Moreover, even the resins "A" and "B" should be used that do not have enough compatibility with each other, a favorable compatibility can be exhibited by the aforementioned condensation/reaction, and as a result, it becomes possible to obtain a coated film having a superior glossiness.

Why the ratio of resin "A" and resin "B" has been limited to aforesaid range is attributed to the following reason. Namely, the water resistance and mechnical strength of the product coating material fall if the proportion of resin "A" exceeds 90 weight % of the total weight of resins "A" and "B" (internal division calculation), while when the proportion of resin "A" is less than 20 weight %, the volume of particle constituents becomes excessive and a smooth finished appearance can not be obtained, thus resulting in an unfavorable effect.

On the other hand, the water solubility is insufficient and a fine aqueous dispersion can not be obtained if the acid value of the resin-reacted substance obtained by the reaction of resins "A" and "B" should be less than 10, and for that reason, the storage stability becomes worse, while if the acid value should exceed 30, the water resistance of the coated film falls and is not favorable.

The end point of the esterification/transesterification reaction of resins "A" and "B" is not always constant and depends on the kinds of resins being used, but it will be generally at the point of time when the acid value of resin reaction product falls under the aforementioned range. Moreover, it is desirous to investigate the solubility of the reaction product with water during the reaction process and to determine the end point when an aqueous dispersion in the colloidal emulsion region presenting an intense bluish color in the dissolved state is obtained. In general, there is the tendency that a finer aqueous dispersion can be obtained as the condensation/reaction is continued longer, but if the reaction should be advanced excessively, a drop in non-volatile matter of aqueous dispersion will be invited which is not favorable. The reaction temperature of the condensation reaction should favorablly be maintained within the range from 150° to 200° C. in order to faciliate the control of the advancement of the reaction.

In the condensation reaction, a hydrophilic organic solvent which does not react with resin "A" and resin "B" can be used for the purpose of facilitating agitation. As the organic solvents in this category the following solvents, for example, can be enumerated: diethylene glycol dimethyl ether, diethylene glycol diethyl ether, triethylene glycol dimethyl ether, triethylene glycol diethyl ether, etc.

The resin reaction product of resins "A" and "B," after neutralization by a base substance, will be emulsified into an aqueous medium to form an aqueous dispersion, and can be used as a film-forming constituent of the aqueous dispersion coating material. Here, an aqueous medium means water or a solvent which an organic solvent or other substances have been mixed with water.

As the base used at this time such bases which are used in general aqueous coating materials can be used, as ammonia, triethylamine, dimethyl ethanol amine, diethyl methanol amine, diethanol amine, methyl diethanol amine, 2-amino-2-methyl propanol, etc. It is desirous that the neutralization ratio of the carboxyl group in the resin reaction product by the base remains within the range of 0.2 to 1 equivalents. If the neutralization ratio is less than 0.2 equivalents, a stable aqueous dispersion can not be obtained, whereas if the ratio exceeds 1 equivalent, the viscosity of the aqueous dispersion is increased and unfavorablly invites the fall in non-volatile matter contained in the product coating material.

To obtain the aqueous dispersion from the neutralized resin reaction product, production can be done either by a method of gradually adding water to the resin reaction product by a method of adding the resin reaction product to water. For the purpose of assisting emulsification, it is preferable to use a resin reaction product and water which has been heated up in advance. Further, for a similar purpose, the organic solvent used in usual aqueous coating materials can be used at 40 weight % or less with respect to the resin reaction product together with the amount which has been used in the said ester condensation reaction.

The aqueous dispersion of resin reaction product which has been obtained through said process can be used, in its single body, as a film-forming constituent of aqueous dispersion type coating material, but if used in combination with a hardening agent, can further improve the water resistance and mechanical strength of the product.

The hardening agent useful in this invention is a substance capable of achieving crosslinking in reaction with the resins "A" and "B" as well as with the resin reaction product. As a crosslinking agents, one or more compounds selected from amino resins and blocked isocyanates are useful. As amino resins, such substances as the condensate of co-condensates of formaldehyde and urea, melamine or benzoguanamine may be used. Further, the etherificated substances of alcohols with 4 carbon atoms with less of these condensates can also be used. As the blocked isocyanates, there may be used such polyisocyanate compounds having two or more isocyanate groups within a molecule blocked with a blocking agent, as ethylene diisocyanate, propylene diisocyanate, tetraethylene diisocyanate, hexamethylene diisocyanate, decamethylene diisocyanate, m-phenylene diisocyanate, p-phenylene diisocyanate, 2,4-tolylene diisocyanate, 2,6-tolylene diisocyanate, 1,5-naphtyl diisocyanate, 4,4', 4"-triphenylmethane triisocyanate, 4,4'-diphenylmethane diisocyanate, 3,3'-dimethyl-4,4'-diphenyl diisocyanate, m-xylylene diisocyanate, p-xylylene diisocyanate, isophorone diisocyanate, trimethylhexamethylene diisocyanate, etc. As the aforesaid blocking agents, such substances are available, for example as phenolic compounds like phenol and cresol, alcohols like methanol, benzyl alcohol and ethylene glycol monoethyl ether, active methylene compounds like aceto acetic acid methyl ester and malonic acid dimethyl ester, amides like acetanilide and acetamide, imides, amines, imidazoles, ureas, carbamates, imines, oximes, mercaptans, sulfites, lactams, etc.

The hardening agent can be introduced into the aqueous dispersion coating material either by the method of mixing it with resins "A" and "B" or the resin reaction product, the method of mixing it directly with the aqueous dispersion, the method of dissolving or previously dispersing it into a water-soluble organic solvent or into the mixture of a water-soluble organic solvent with water, or the method of mixing it with a coating material. These methods may be selected optionally depending on the kinds of hardening agents.

In the present invention, the ratio of the resin reaction product and the hardening agent should preferably be within a range from 95:5 through 60:40 in weight ratio. If the proportion of hardening agent is less than 5 weight % of the total weight of the resin reaction product (internal division calculation), the crosslinking density will be too low, resulting in insufficient water resistance and strength of the coated film, whereas if the hardening agent exceeds 40 weight %, crosslinking will be promoted excessively, resulting in a loss in flexibility, which is not favorable.

The aqueous dispersion coating material according to the present invention can be produced by a publicly known method by adding to the dispersion other constituents as necessary, for example, other water-soluble resins, hardening agents, surface conditioning agents, etc. after adding the hardening agent according to the technique described above to the aqueous dispersion of resin reaction product which could be obtained as per the description. Further, when a pigmented aqueous dispersion coating material is to be produced, such a coating material can be produced by a method of preparing the pigment paste in accordance with a usual method using a part of resin "A" and mixing it with the aqueous dispersion of the resin reaction product, or by the method of having the pigment kneaded previously into the resin reaction product and producing a aqueous dispersion of pigment-containing resin reaction product.

The aqueous dispersion coating material which has been produced in the above method can, like conventional aqueous dispersion coating materials in general, be applied to a coating object by such methods as brushing, spraying immersing and electrostatic coatings, and form a film by stoving or baking.

The aqueous dispersion coating material according to the present invention, because it contains as a film-forming constituent, the resin reaction product of a hydrophobic, high molecular weight, linear polyester resin, which has excellent water resistance and mechanical strength, and a low polarity aqueous polyester resin, can form a coated film having high level of water resistance and mechanical strengh. In addition, since the aforesaid hydrophobic, high molecular weight, linear polyester resin is added to the aqueous polyester resin, the reaction product can be emulsified into water in a particle size of the colloidal emulsion region and the coated film having excellent adhesion, storage stability, finished appearance and other coated film properties can be obtained.

DESCRIPTION OF PREFERRED EMBODIMENTS

Next, examples of the present invention are to be described. In each of the examples, the expressions of "Parts" and "%" stand for the weight parts and weight %, respectively.

PRODUCTION EXAMPLE 1

Production of Resin "A1"

30.0 parts of isophthalic acid, 33.5 parts of 1,5-pentyl glycol and 10.0 parts of trimethylol propane were charged into a 4-necked flask equipped with an agitator, thermometer, reflux cooler and nitrogen gas introducing pipe and were heated to 180° C. for one hour. At the point of time when a temperature of 180° C. was reached, 0.1 part of an esterification catalyst, FASCAT No. 4100 (trademark of M & T Chemicals Corporation) was charged into the mixture which was then heated to 220° C. for 2.5 hours to achieve esterification and a reaction product with an acid value of 10 was obtained. After cooling this reaction product down to 180° C., 16.4 parts of adipic acid and 10.0 parts of trimellitic anhydride were added to it and esterification was conducted at 170° to 190° C. for 4 hours, and a water-soluble polyester resin "A1" having an acid value of 40, hydroxyl group value of 120 and number average molecular weight of 1,400 was obtained.

PRODUCTION EXAMPLE 2

Production of Resin "A2"

30.0 parts of isophthalic acid, 31.0 parts of 1,5-pentyl glycol and 11.4 parts of trimethylol propane were charged into a flask similar to that in Production Example 1, and heated to 180° C. for 1 hour. At the point of time when a temperature of 180° C. was reached, 0.1 part of an esterification catalyst, FASCAT No. 4100 (already described above) was charged into the mixture and heated to 220° C. for 2.5 hours for achieving esterification, and thus a reaction product with acid value of 10 was obtained. After cooling the reaction product down to 180° C., 17.5 parts of adipic acid and 10.0 parts of trimellitic anhydride were added and esterification was continued at 170° to 190° C. for 3 hours, thus a water soluble polyester resin "A2" with an acid value of 60, hydroxyl value of 120 and number average molecular weight of 1200 was obtained.

PRODUCTION EXAMPLE 3

Production of Resin "B1"

60.0 parts of isophthalic acid, 20.0 parts of 1,5-pentyl glycol and 19.9 parts of neopentyl glycol were charged into a flask similar to that in Production Example 1 and heated to 180° C. for 1 hour. At the point of time when a temperature of 180° C. had been reached, 0.1 part of an esterification catalyst, FASCAT No. 4100 (already described above) was charged into the mixture, and, after being heated to 240° C. for 6 hours, esterification was further continued at the same temperature for an additional 3 hours, and a hydrophobic, linear polyester resin "B1" with an acid value of 5, softening point of 65° C. and number average molecular weight of 3,800 was obtained.

EXAMPLE 1

48 parts of an aqueous polyester resin "A1" and 32 parts of a hydrophobic linear polyester resin VYLON (already described above) were charged into a flask similar to that in Production Example 1, and esterification was continued at 180° C. for 2 hours and a resin reaction product with an acid value of 22, where the ratio of resin "A1" resin "B" (VYLON 200) was 60:40, was obtained. Next, the resin reaction product cooled down to 120° C. and was then added to 20 parts of ethylene glycol monobutyl ether. Thus a varnish with non-volatile matter of 80% was obtained. Next, the varnish was cooled down to 60° C. and added to 2.1 parts of dimethyl ethanol amine which corresponded to 0.75 mol equivalent of carboxyl group within the resin reaction product while agitating it using a Homo disper (manufactured by Tokushu Kika Kogyo Co., Ltd., hereinafter to be quoted in the same manner) in order to achieve the uniform neutralization of the mixture, which was then gradually added to 120 parts of deionized water, thus an aqueous dispersion with a non-volatile matter content of 36% and having an intense bluish colour was obtained.

In the next step, in order to produce a white aqueous dispersion coating material out of the aqueous dispersion, an aqueous resin solution of water soluble polyester resin with non-volatile matter content of 35% was obtained which consists of 33.0 parts of a water-soluble polyester resin "A1", 8.3 parts of ethylene glycol monobutyl ether, 1.6 parts of dimethyl ethanol amine and 57.1 parts of deionized water. Then, a mixture of 30.3 parts of the aqueous resin solution, 60.0 parts of titanium dioxide and 9.7 parts of deionized water was dispersed using a sand mill for one hour to prepare a white paste, 44.85 parts of this white paste, 50.90 parts of the aqueous dispersion, 4.00 parts of a water-soluble melamine resin (CYMEL No. 303 trademark of Mitsui Toatsu Chemical Inc., hereinafter to be called by the same name) as a hardening agent (crosslinking agent), 0.15 part of paratoluene sulfonic acid and 0.10 parts of an additive for aqueous coating materials (ADDITOL XW329 trademark of Hoechst Corporation, hereinafter to be called by the same name) were mixed and a white aqueous dispersion coating material with non-volatile matter content of 53.7% was obtained in which the ratio of pigment portion and resin portion was 1:1, the ratio of water-soluble polyester resin "A1" and hydrophobic linear polyester resin "B" (VYLON 200) was 68:32, and the ratio of the resin (A1+B) and the melamine resin was 85:15.

EXAMPLES 2 and 3

Using CHEMIT K1294 (described previously) in Example 2 and POLYESTER SP170 (trademark of Nihon Gosei Kagaku Kogyo Co., Ltd. with a softening point at 94° C. and number average molecular weight at 19,000) in Example 3 instead of VYLON 200 which is resin "B" used in Example 1, resin reaction products with an acid value of 22 were obtained in which the ratio of resin "A" to resin "B" was 60:40 respectively. The resin reaction products were cooled down to 120° C. and added to 20 parts of ethylene glycol monobutyl ether. Thus, varnishes with respective non-volatile matter contents of 80% were obtained.

Then, a white aqueous dispersion coating material was produced in the same manner as in Example 1. In other words, VYLON 200 in Example 1 was changed to CHEMIT K1294 in Example 2 and changed to POLYESTER SP170 in Example 3, and through similar compound ratios and control procedures, white aqueous dispersion coating materials with a solid content of 53.7% were obtained in which the ratio of pigment portion and resin portion was 1:1, the ratio of water-soluble polyester resin "A1" and CHEMIT K1254 which was a hydrophobic linear POLYESTER resin "B", or Polyester SP170 was 68:32, and the ratio of the resin (A2+B) and melamine resin was at 85:15.

COMPARATIVE EXAMPLE 1

Using a water soluble polyester resin "A1", which was used in Example 1, a water soluble coating material not containing VYLON 200 which is a hydrophobic, high molecular weight, liner polyester resin, was produced in comparison with Example 1.

Namely, mixing 53.12 parts of an aqueous resin solution of a water-soluble polyester resin "A1", 42.78 parts of white paste, both of which were obtained in Example 1, 3.85 parts of a water soluble melamine resin (described earlier), 0.15 parts of paratoluene sulfonic acid, and 0.10 parts of an additive (described earlier) for aqueous coating materials, a water-soluble white coating material with a non-volatile matter content of 51.3% was obtained in which the ratio of water-soluble polyester resin "A1" and hydrophobic linear polyester resin "B" was 10:90 and the ratio of resin (A1+B) and melamine resin was 85:15.

COMPARATIVE EXAMPLE 2

An aqueous dispersion coating material was produced using the water soluble polyester resin "A2", which is higher in acid value than the water-soluble polyester resin "A1" which was used in Example 1, and using the resin reaction product with VYLON 200 (resin "B") having an acid value in excess of 30.

In other words, the water-soluble polyester resin "A1" in Example 1 was changed to the water-soluble polyester resin "A2" and a resin reaction product with an acid value of 34 was obtained with a similar compound ratio and control procedures. Then, a white aqueous dispersion coating material with a non-volatile matter content of 53.7% was obtained in which the ratio of pigment portion and resin portion was 1:1, the ratio of water soluble polyester resin "A2" and Vylon 200, which is a hydrophobic, high molecular weight, linear polyester resin "B", was 68:32, and the ratio of resin (A2+B) and melamine resin was 85:15.

COMPARATIVE EXAMPLE 3

An aqueous dispersion coating material was produced using a hydrophobic, linear polyester resin "B1", which was lower in molecular weight than VYLON 200 which was resin "B" used in Example 1.

In other words, Vylon 200 in Example 1 was changed to a hydrophobic, linear polyester resin "B1" and a resin reaction product with an acid value of 24 was obtained with a similar compound ratio and control procedures. Then, a white aqueous dispersion coating material with a solid content of 53.7% was obtained in which the ratio of pigment portion and resin portion was 1:1, the ratio of water-soluble polyester resin "A1" and hydrophobic linear polyester resin "B1" was 68:32 and the ratio of resin (A1+B1) and melamine resin was 85:15.

EXPERIMENTAL EXAMPLE

A cationic electro-deposition coating material (AQUA No. 4200, trademark of Nippon Oil and Fats Co., Ltd.) was electro-deposited onto a cold-rolled steel plate of 0.8 mm thickness treated with zinc phosphate so that the coated film thickness would be 20 microns in the dry state. After baking at 175° C. for 25 minutes, diluted coating material of the white aqueous dispersion type coating material prepared in each of the aforesaid Examples and Comparative Examples diluted with de-ionized water to adjust the viscosity (at 20° C.) to 30 seconds by using Ford cup No. 4 was sprayed onto the plate so that the coated film thickness in dry state may become 30 microns. After setting at 20° C. for 10 minutes, setting was continued at 60° C. for an additional 5 minutes, then the completed coated film was obtained after baking at 160° C. for 30 minutes. Then physical property and water resistance property tests were conducted on the coated film of the obtained test piece.

Additionally, a completed coated film of 30 microns was deposited on a tin foil through procedures similar to above. The tin foil was then dissolved in mercury in order to prepare a free film, and the Young's modulus and tensile strength of the obtained coated film were measured by a tensile testing machine. The results are described in Table 1.

TABLE 1

| Test items | | Example 1 | Example 2 | Example 3 | Comparative Example 1 | Comparative Example 2 | Comparative Example 3 |
|---|---|---|---|---|---|---|---|
| 60 degree specular glossiness | (1) | 96 | 95 | 97 | 95 | 93 | 90 |
| Pencil hardness | (2) | HB | HB | HB | B | F | HB |
| Adhesive property | (3) | 100/100 | 100/100 | 100/100 | 100/100 | 100/100 | 100/100 |
| Erichsen film distensibility test (mm) | (4) | 9.1 | 9.3 | 9.2 | 7.0 | 9.0 | 8.5 |
| Moisture resistance | (5) | Favorable | Favorable | Favorable | Softening, swelling & bulging | Softening & swelling | Softening & swelling |
| Young's modulus of coated film $\times\ 10^{10}$ (dyn/cm$^2$) | (6) | 3.60 | 3.58 | 3.50 | 1.25 | 3.40 | 2.10 |
| Breakdown strength of coated film $\times\ 10^5$ (g/cm$^2$) | (6) | 5.37 | 5.25 | 4.89 | 2.06 | 4.80 | 2.41 |

(Notes)
(1) According to "Article 6.7: 60-degree specular glossiness" as set forth in JIS K5400
(2) To comply with "Article 6.14: Pencil scratching test" of JIS K5400 and with "Article 8.10: Pencil scratching test method" of JIS D0202. Cut the wooden portion of a pencil MITSUBISHI UNI, trademark of Mitsubishi Pencil Co., Ltd.), press and abrade its core at an angle of 45 degrees against the coated steel plate surface, and the pencil hardness just before a scar is made on the coated surface shall be taken as the tested value.
(3) To comply with "Article 6.15: Crosscut adhesion test" of JIS K5400 and "Article 8.12: Crosscut adhesion test method" of JIS D0202, 11 parallel lines at 1 mm equal spacing was drawn orthogonally to each other onto a test piece using a sharp and thin blade (NT CUTTER trademark) so as to create 100 individual squares of 1 mm$^2$, to which a cellophane adhesive tape of 24 mm width was applied and immediately pulled upwardly away, and if no squares were peeled away, the test result would be recorded as 100/100.
(4) By use of Erichsen film distensibility test machine.
(5) The appearance of coated film, after it had been left for 360 hours in a humidity cabinet at temperature of 50° C. with a humidity of 98%, was observed.
(6) Machine model of tensile testing machine: Model UTM-III-200 (manufactured by Orienteck Co., Ltd.). Measured temperature: 20° C., Tension speed: 4 mm/min.

From the above mentioned results, the coated films that were obtained from Examples 1 through 3 provided excellent finished appearance (60-degree specular glossiness), coated film physical properties (pencil hardness, adhesion property, Erichsen film distensibility test), water resistance (moisture resistance) and mechanical strength (Young's modulus and breakdown strength of coated film).

In contrast to this, Comparative Example 1 did not contain any hydrophobic, linear polyester resin and was inferior in water resistance and mechanical strength. Comparative Example 2 used a water soluble polyester resin with a high acid value and, moreover, the acid value of the resin reaction product exceeded 30, and had inferior water resistance. Comparative Example 3 was inferior in water resistance and mechanical strength since the number average molecular weight of the hydrophobic linear polyester resin was less than 10,000.

What is claimed is:

1. An aqueous dispersion coating material containing, as a film-forming constituent, an aqueous dispersion prepared by a process comprising:

reacting a first resin consisting essentially of a carboxyl group-containing polyester resin capable of being rendered water-soluble when neutralized, said carboxyl group-containing polyester resin having an acid value of from 20 to 50, a hydroxyl value of from 50 to 200 and a number-average molecular weight of from 1,000 to 10,000, with a second resin consisting essentially of a hydrophobic linear polyester resin, said hydrophobic linear polyester resin being synthesized soley from a dicarboxylic acid constituent and a glycol constituent and having a softening point of from 40° C. to 200° C. and a number average molecular weight of from 10,000 to 100,000, said second resin containing a hydroxyl group or a carboxyl group only as a terminal group, said first resin being reacted with said second resin in a weight ratio of from 90:10 to 20:80 and at a temperature of from 150° C. to 200° C. in an ester-forming condensation reaction to form a resin reaction product having an acid value of from 10 to 30 and unesterified carboxyl groups;

neutralizing the resin reaction product with a base; and emulsifying the neutralized resin reaction product in an aqueous medium to prepare said aqueous dispersion.

2. The aqueous dispersion type coating material of claim 1 wherein the aqueous dispersion contains a hardening agent.

3. The aqueous dispersion type coating material of claim 2 wherein the hardening agent is one or more compounds selected from amino resins and blocked isocyanates.

4. The aqueous dispersion coating material of claim 1, wherein said base has a neutralization ratio with said unesterified carboxyl groups of said resin reaction product of from 0.2 to 1 equivalents.

5. The aqueous dispersion coating material of claim 1, wherein said carboxyl group-containing polyester resin has an acid value of 40, a hydroxyl value of 120 and a number-average molecular weight of 1,400.

6. The aqueous dispersion coating material of claim 1, wherein said carboxyl group-containing polyester resin has an acid value of 60, a hydroxyl value of 120 and a number-average molecular weight of 1,200.

7. The aqueous dispersion coating material of claim 2, wherein the weight ratio of the resin reaction product to the hardening agent in the aqueous dispersion is from 95:5 to 60:40.

* * * * *